(12) United States Patent
Osborn et al.

(10) Patent No.: US 8,016,065 B2
(45) Date of Patent: Sep. 13, 2011

(54) SPLIT CHAINCASE WITH FIXED AXLES

(75) Inventors: Jason A. Osborn, Oakes, ND (US); Wally Kaczmarski, Lisbon, ND (US)

(73) Assignee: Clark Equipment Company, West Fargo, ND (US)

( * ) Notice: Subject to any disclaimer, the term of this patent is extended or adjusted under 35 U.S.C. 154(b) by 352 days.

(21) Appl. No.: 12/208,741

(22) Filed: Sep. 11, 2008

(65) Prior Publication Data
US 2010/0059305 A1 Mar. 11, 2010

(51) Int. Cl.
*B60K 17/342* (2006.01)
(52) U.S. Cl. ...................................... 180/233; 180/6.48
(58) Field of Classification Search .................. 180/233, 180/6.48
See application file for complete search history.

(56) References Cited

U.S. PATENT DOCUMENTS

| | | | |
|---|---|---|---|
| 2,002,474 A | 5/1935 | Johnson et al. | |
| 3,085,643 A | 4/1963 | Schwartz et al. | |
| 3,129,780 A * | 4/1964 | Uyehara | 180/24.08 |
| 3,231,117 A | 1/1966 | Melroe et al. | |
| 3,635,365 A | 1/1972 | Bauer | 214/778 |
| 3,645,350 A | 2/1972 | Deli et al. | |
| 3,767,254 A | 10/1973 | Skanes et al. | |
| 3,866,700 A | 2/1975 | Bauer | |
| 3,895,728 A | 7/1975 | Heggen | |
| 3,910,367 A | 10/1975 | Drone et al. | |
| 4,055,262 A | 10/1977 | Bauer et al. | |
| 4,060,261 A | 11/1977 | Bauer et al. | |
| 4,074,782 A | 2/1978 | Bauer | |
| 4,150,474 A | 4/1979 | Bauer et al. | |
| 4,168,757 A * | 9/1979 | Mather et al. | 180/6.48 |
| 4,186,812 A | 2/1980 | Sutton | |
| 4,359,116 A | 11/1982 | Mankey | |
| 4,815,550 A | 3/1989 | Mather et al. | |
| 4,955,455 A * | 9/1990 | Albright et al. | 180/291 |
| 4,962,821 A * | 10/1990 | Kim | 180/6.48 |
| 4,962,825 A * | 10/1990 | Albright et al. | 180/292 |

(Continued)

FOREIGN PATENT DOCUMENTS
EP 1710357 10/2006
(Continued)

OTHER PUBLICATIONS
Prior Art chain drive (Sheets 1 and 2).
(Continued)

*Primary Examiner* — Kevin Hurley
*Assistant Examiner* — Michael Stabley
(74) *Attorney, Agent, or Firm* — John D. Veldhuis-Kroeze; Westman, Champlin & Kelly, P.A.

(57) ABSTRACT

A tool carrier, such as a compact loader, has a main frame formed as a transmission housing that is all welded construction. The transmission housing has drives from motors and drive shafts on each side of the transmission housing. The drives are in enclosed chain cases forming integral parts of the transmission housing. The drive shafts span the power drive cases and are supported on bearings on both ends. The drives in each of the power drive cases drive front and rear axles of the compact loader. Axle tubes also are welded in place on the transmission housing. The rear portions of the transmission housing have support arm castings supported in and closing the ends of the power drive cases. The support arm castings provide support for mounting lift arms for the compact loader.

21 Claims, 10 Drawing Sheets

U.S. PATENT DOCUMENTS

| | | | |
|---|---|---|---|
| 5,551,523 A | 9/1996 | Berg et al. | |
| 5,992,576 A | 11/1999 | Berg et al. | |
| 6,098,739 A * | 8/2000 | Anderson et al. | 180/312 |
| 6,108,907 A * | 8/2000 | Anderson et al. | 29/897.2 |
| 6,205,665 B1 * | 3/2001 | Anderson et al. | 29/897.2 |
| 6,401,847 B1 | 6/2002 | Lykken | |
| 6,425,453 B1 * | 7/2002 | Knutson et al. | 180/256 |
| 6,446,744 B2 | 9/2002 | Wubbolts et al. | |
| 6,513,614 B2 * | 2/2003 | Knutson et al. | 180/242 |
| 6,604,600 B2 | 8/2003 | Fournier et al. | |
| 6,651,768 B2 | 11/2003 | Fournier et al. | |
| 6,665,482 B2 | 12/2003 | Kawasaki et al. | |
| 6,719,075 B2 | 4/2004 | Kamikawa | |
| 6,742,619 B2 | 6/2004 | Farbotnik et al. | 180/312 |
| 6,786,289 B2 | 9/2004 | Bateman et al. | 180/6.48 |
| 6,823,961 B2 * | 11/2004 | Lamela et al. | 180/305 |
| 6,832,659 B1 | 12/2004 | Bares et al. | |
| 6,926,105 B2 | 8/2005 | Brazier | |
| 7,000,724 B2 * | 2/2006 | Lamela et al. | 180/242 |
| 7,036,622 B2 * | 5/2006 | Iwaki | 180/311 |
| 7,044,258 B2 | 5/2006 | Lamela et al. | 180/305 |
| 7,156,200 B2 * | 1/2007 | Dershem et al. | 180/311 |
| 7,373,999 B2 * | 5/2008 | Haringer | 180/9.48 |
| 2003/0205424 A1 * | 11/2003 | Felsing et al. | 180/242 |
| 2004/0239092 A1 | 12/2004 | Haringer | |
| 2005/0167969 A1 * | 8/2005 | Fukazawa et al. | 280/785 |
| 2006/0001250 A1 | 1/2006 | Fukazawa et al. | |

FOREIGN PATENT DOCUMENTS

| | | |
|---|---|---|
| EP | 1811089 | 7/2007 |
| JP | 2004 017705 | 1/2004 |
| WO | WO 2005/054043 | 6/2005 |

OTHER PUBLICATIONS

Written Opinion and International Search Report of Applic. No. PCT/US2009/055644, filed Sep. 2, 2009. Reports dated Feb. 25, 2010.

Liehr, Douglas et al.; United States Defensive Publication No. T966,007 (was not accepted as a Publication on this form when entering it) Jan. 3, 1978. Main Frame for Loader Vehicle.

* cited by examiner

SPLIT CHAINCASE WITH FIXED AXLES

BACKGROUND

The present disclosure relates to a transmission housing weldment for a compact tool carrier that employs a split power drive or chain case design having the drive mechanisms, such as chain drives, spaced from the center of the transmission housing. The all-welded transmission and axle assembly forms a compact tool carrier main frame.

Compact tool carriers, such as compact loaders, have wheels at opposite sides of the machine which are independently driven and controlled. This usually involves independent power drive motors for driving the wheels on the opposite sides of the machine. A transmission case or housing supports the drive motors, the axle housings, axles, and suitable drives, such as chain and sprocket drives for the wheels on each of the sides of the machine. The transmission housing essentially forms a main frame for the tool carrier and thus requires rigidity and strength. Manufacturers make loaders of similar design that may be skid steer loaders or loaders with steerable wheels. The present transmission housing is designed so it can be used for either skid steer or steerable wheel machines. Transmission cases that have been partially welded in subassemblies and then assembled with bolts or fasteners have been used in the past.

SUMMARY OF THE INVENTION

The present disclosure relates a welded transmission housing or case assembly that has power drive component cases or housings positioned at the lateral sides of the transmission housing, leaving space in the center for mounting drive motors. Drive shafts driving the drive mechanisms or chains on each side of the transmission housing are supported on both ends of the shafts, including removable external bearing carriers, mounted on the outer sides of the transmission housing assembly.

In addition to having a welded construction for the transmission, the axle housings, which are support tubes for the four axles of the tool carrier, are welded as part of the transmission housing assembly.

Additionally, in one aspect of the disclosure, the welded power drive or chain cases in the transmission housing, which are formed preferably with rectangular cross section chamber openings, are used for mounting support arm castings that extend to the rear of the compact tool carrier to form supports for a lift arm assembly of the compact tool carrier.

The present design makes it possible to accommodate either electric drive motors, or hydraulic drive motors, which are conventionally used. The splitting of the drives to the opposite sides of the machine and keeping the drives spaced provides a region in the transmission housing or case in which drive motors and components can be mounted. The transmission housing includes cross members welded in place, on which an engine, hydraulic components and the like can be mounted.

DETAILED DESCRIPTION OF ILLUSTRATIVE EMBODIMENTS

Figure 1:
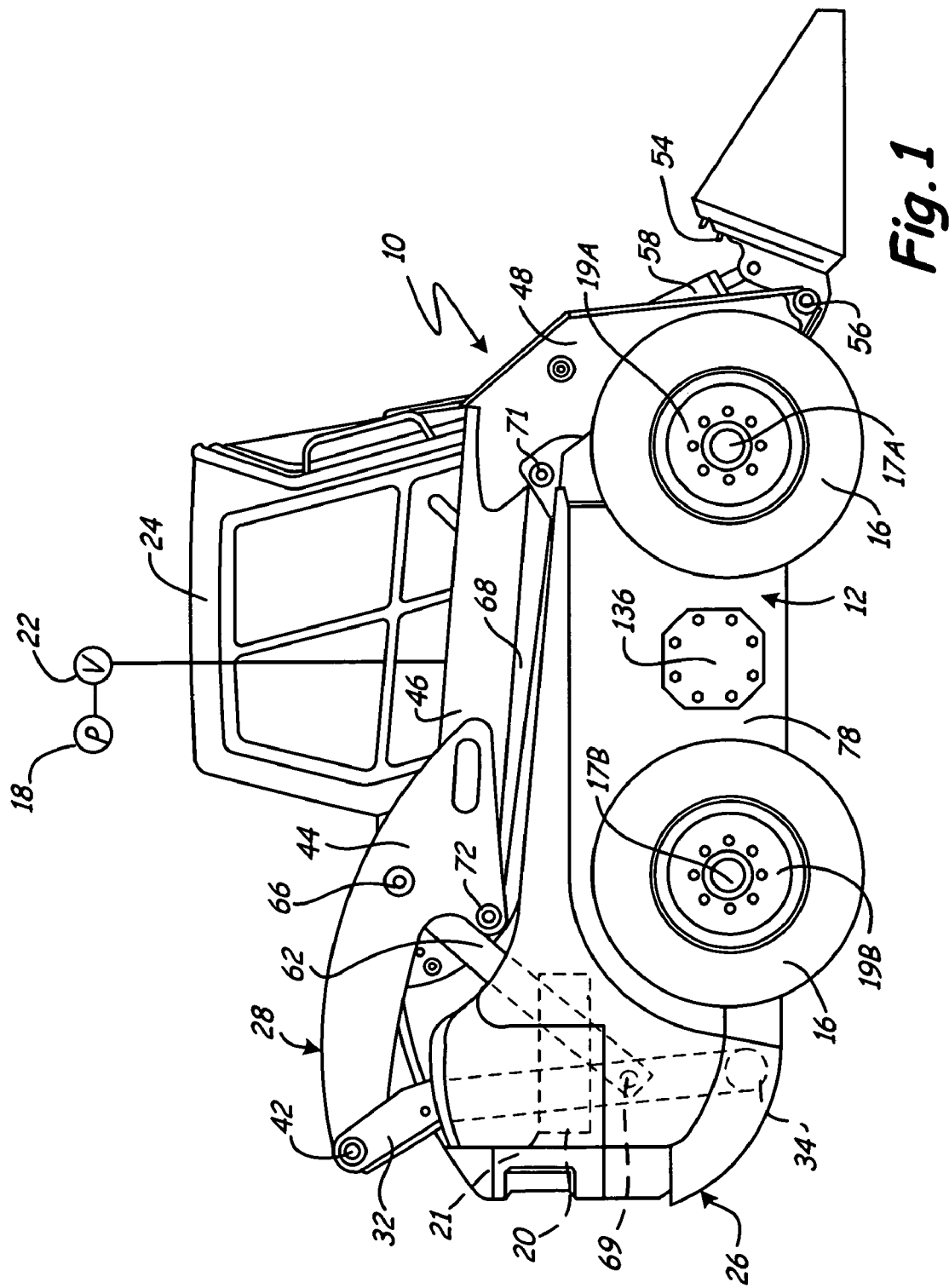
FIG. 1 is a perspective view of a typical compact tool carrier comprising a loader having a transmission case or housing made according to one aspect of the present disclosure.
Figure 2:
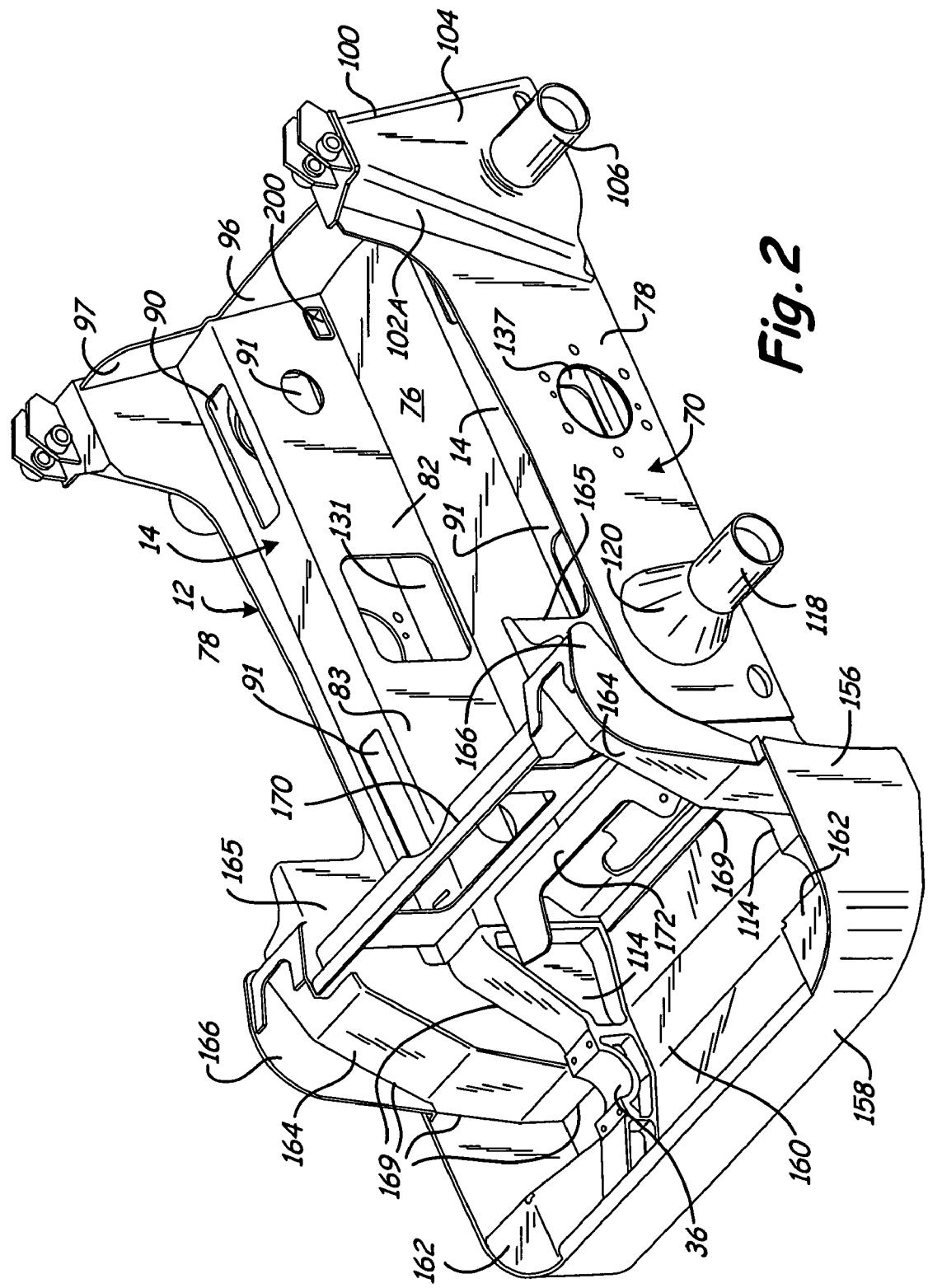
FIG. 2 is a rear perspective view of the transmission housing weldment made according to the present disclosure.
Figure 7:
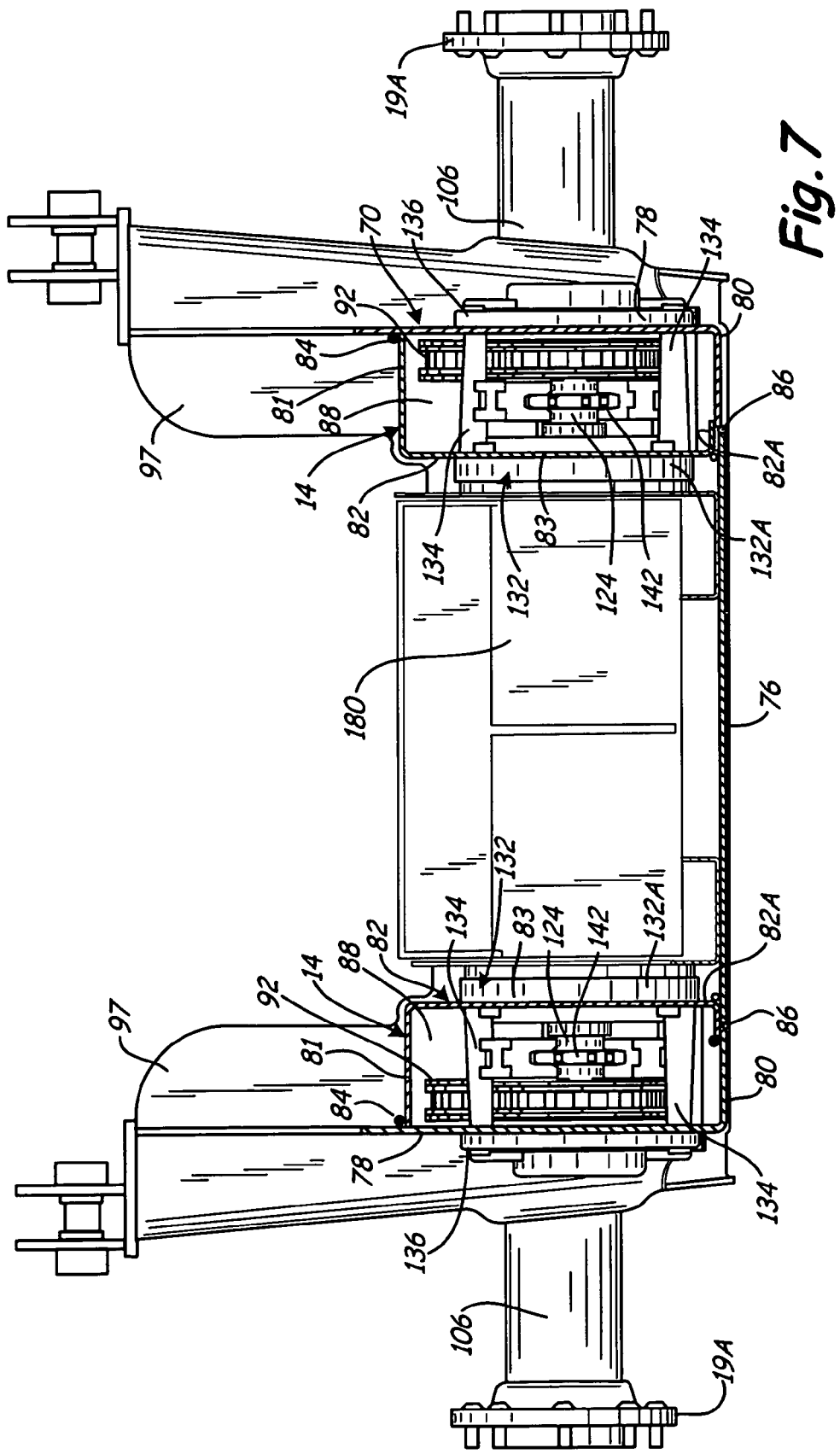
FIG. 7 is a sectional view taken on line 7-7 in FIG. 4.

Referring first to FIG. 1, a compact tool carrier, as shown a compact loader 10 includes a transmission housing assembly or main frame 12, that includes an elongated transmission housing having interior power drive or chain cases 14 along the sides of the housing, as shown in FIGS. 2 and 7, for example. The transmission housing assembly or main frame 12 will be more fully explained, but as shown in FIG. 1, the transmission housing assembly 12 supports drive axles 17A and 17B holding wheel hubs 19A and 19B that drive wheels 16 on opposite sides of the loader. The drive axles, as will be shown, are supported in axle housings or tubes and are driven with chain drives inside the transmission housing, using suitable motors, either electric or hydraulic motors. An internal combustion engine 21 in an engine compartment 20 is mounted to the top of the transmission assembly or main frame 12 and provides power for the loader. The transmission housing assembly 12 has rearwardly extending portions 26, including spaced side support arm castings 114 (FIG. 3) that are mounted to the transmission housing assembly 12, and which provide support for a lift arm assembly 28.

Figure 4:
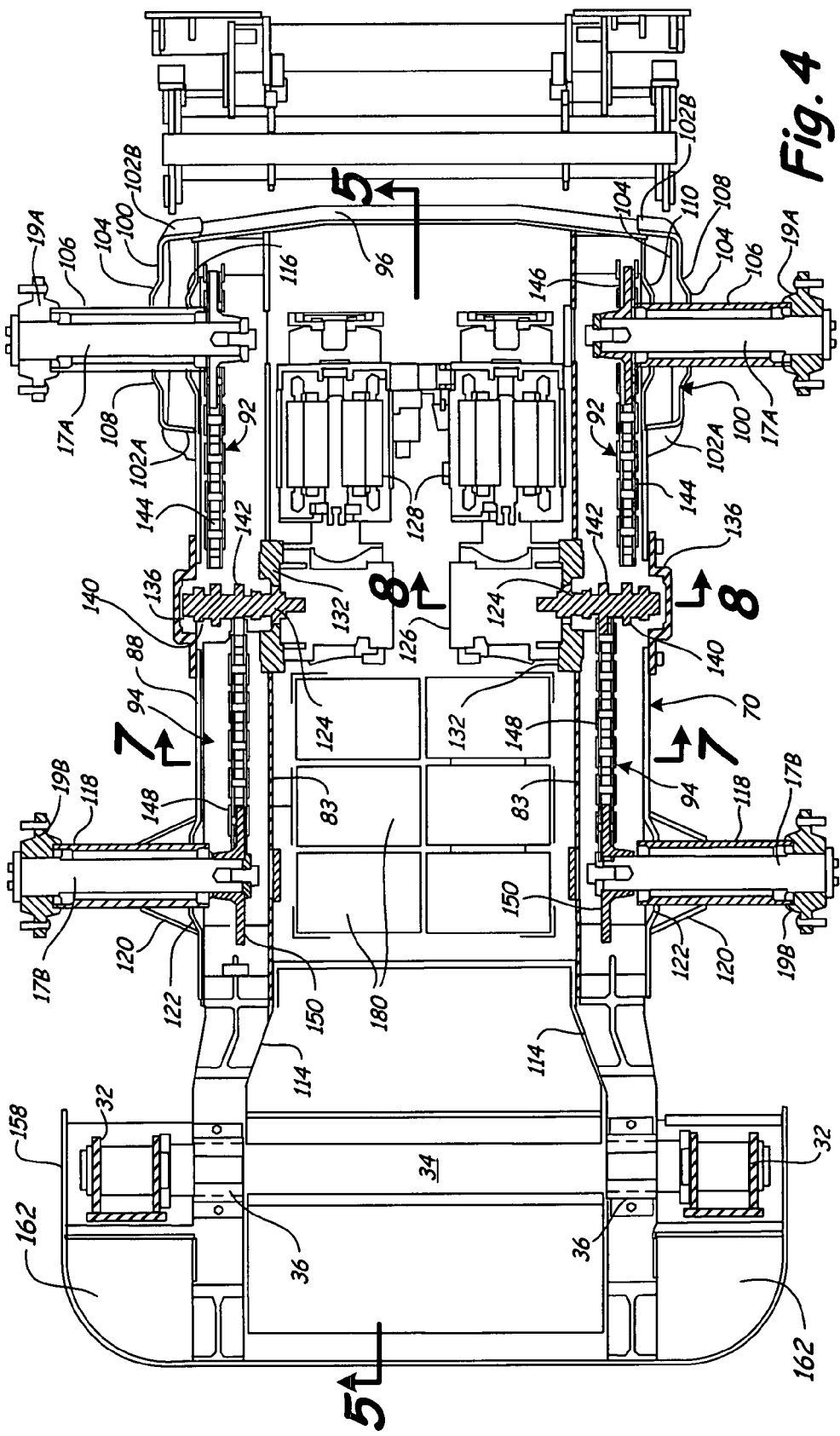
FIG. 4 is a top plan view of the transmission housing or case of the present disclosure with electric drive motors shown in place.
Figure 5:
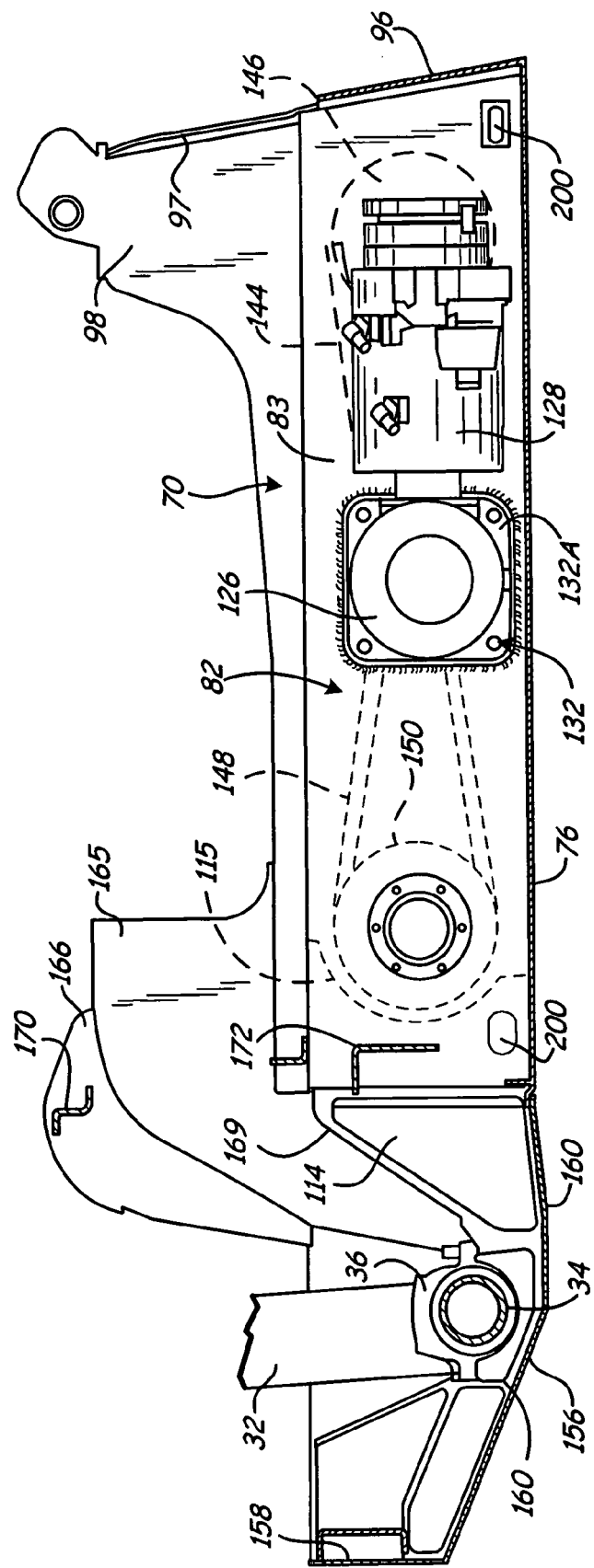
FIG. 5 is a longitudinal connection of the transmission housing shown in FIG. 4 with fragmentary lift arm components installed for illustrative purposes.

The lift arm assembly 28 includes a pair of upright posts 32 that are mounted on a lower cross tube 34 (see FIGS. 4 and 5). Cross tube 34 is mounted in suitable bearing journals illustrated at 36. The cross tube 34 is positioned at the lower, rear portion of the loader.

The upright posts 32, forming base links for the lift arm assembly 28, have suitable pivots 42 at their upper ends that mount lift arms 44 including forward lift arm sections 46 and 48. The forward and lower ends of the forward arm sections 48 mount a tilting attachment plate 54 on pivots 56. The tilting of the attachment plate 54 is controlled with a hydraulic actuator 58 through a valve (not shown).

The lift arms 44 are raised and lowered by operation of hydraulic actuators 62 (one on each side of the frame) that are pivotally mounted to the upright arms 32 at pivots 69, and the actuators 62 are pivotally mounted to the lift arm sections 44 at pivots 66. To control the path of movement of the lift arms, control links 68, one on each side of the machine, are connected at a pivot 71 to the main frame or transmission housing assembly 12, and the opposite ends of the links 68 are pivoted as at 72 to the respective lift arm 44. This type of lift arm assembly and mounting is generally as shown in U.S. Pat. No. 6,866,466, which is incorporated by reference. Other lift arm arrangements are also used.

A suitable hydraulic pump shown at 18, and a valve 22 are schematically illustrated for operating the lift arm actuators 62 for raising and lowering the lift arms. In addition, an operator's cab 24 is illustrated surrounding an operator area.

The transmission housing assembly 12 has an all welded, split chain case transmission housing or case 70 (FIG. 2) that mounts the drive components and the lift arm assembly. The transmission housing 70 is an all welded construction that provides strength and rigidity. The all welded construction means that at the selected locations where two separately formed structural wall sections or panels join, the junctions are welded. The transmission housing 70 has some walls where a single panel is formed into an "L" shape to form a closed junction between the two walls formed. Separate power drive or chain case sections 14 are positioned along opposite sides of the transmission housing 70.

The power drive cases 14 are called chain cases in this description, but the drives in the cases can be belts or gear trains. The cases 14 are on opposite sides of the transmission housing 70 and are rectangular in cross section as shown, and have rectangular cross section chambers 88, as perhaps best seen in FIG. 7. The transmission housing 70 includes upright exterior side walls 78 on each side of the transmission housing and the side walls 78 have integrally formed inturned flanges 80 that form a bottom wall section or segment. The panels forming the side walls are thus L-shaped. The lower flanges 80 of the formed L shape are part of the bottom wall of the transmission housing when welded to a bottom wall 76. These flanges 80 form the bottom walls of the power drive or chain cases, for convenience of manufacture. as will be explained. Generally channel-shaped, formed, inner chain case wall sections 82 each have a top wall 81 formed integrally with an upright case wall 83 and a bottom case wall flange 82A from one panel of material. The top walls 81 are welded at top junctions 84 to the respective upright side walls 78. The flanges 80 on the side walls 78 of the transmission housing 70 are welded along their length to the lower or bottom flanges 82A of the formed chain case wall sections 82 as shown at 86. This encloses the longitudinally extending interior drive component chambers 88 of the chain cases 14. Thus in assembly the upright side walls 78 of the transmission housing, the flanges 80, and the case wall sections 82 that include side, top and bottom walls of the chain cases 14, can be secured together as separate chain case subassemblies, (one right side and one left side) before being joined together to form the transmission housing. When the transmission housing is further assembled, the bottom wall 76 is welded longitudinally to the flanges 80 and 82A that form the bottom walls of the chain cases.

The chambers 88 are provided with top access openings shown at 90 and 91 in FIG. 2, and the access openings are covered with bolt on sealed covers in use. The chambers 88 are oil bath chambers for power drives, as shown, chain and sprocket drives indicated generally in FIG. 4 at 92 and 94, on each side of the transmission housing. Chain drives 92 drive the front axles and chain drives 94 drive the rear axles.

In addition, the transmission housing 70 weldment includes a front plate 96 that extends across the front of the transmission housing. The front plate 96 extends upwardly and is welded along the front side edges of the side walls 78. The front plate includes upwardly extending spaced side portions 97 (FIG. 3) along the sides of the transmission housing, and the portions 97 can be formed on a separate section welded to the upright front plate 96. The front portions of the side walls 78 have upwardly extending flanges 98 (FIGS. 3 and 5), that are welded to the upright portions 97 of the front plate 96. The front plate 96 encloses the forward end of the rectangular cross section tubular chain case 14 and the walls of the chain cases are welded to the front plate 96.

Front axle tube support housings 100, one on each side of the front plate 96 are welded to the front plate 96, the side portions 97 and side walls 78, and extend around the front corners of the transmission housing 70. As shown in FIG. 4, the axle support housings 100 have flanges 102A and 102B that space an outer wall 104 of the housings 100 outwardly from the respective side wall 78. The flanges 102A are welded along the outer surface of the side walls 78, and the flanges 98 of the side walls.

Also, as shown in FIG. 4, laterally extending front axle support housings or tubes 106 on opposite sides of the transmission housing are welded to provided flanges 108 on the support housings 100. The axle tubes 106 pass through openings in formed collars 110 on the side plates 78. The axle tubes 106 are welded to the collars 110 and 104 where they pass through the collars.

After starting the assembly of components supported on the all welded transmission housing, the front drive axles 17A are positioned in the axle support tubes 106, and the axles are mounted on suitable bearings in the axle support tubes with seals to contain the oil in the chain cases 14. The inner ends of axles 17A extend into the interior chambers 88 of the chain cases 14, but terminate short of the upright inner case wall 83 of the channel-shaped inner case wall sections 82 on the interior of the transmission housing. Sprockets 146 (used for a chain drive) are splined onto the inner ends of axles 17A and held in place with washers and capscrews.

In assembly, rear drive axles 17B are supported on suitable bearings (the outer bearings have seals) in rear axle housings or tubes 118, that are supported on collars 120 that are welded to the side walls 78, and also welded around the axle tubes where the edges of inverted U-shaped openings of the collars 120 join the axle tubes. Additionally, the axle tubes 118 extend through openings in side walls 78 and are supported on and welded to formed collars 122 (FIG. 4) on the side walls 78 that are similar to collars 110 for the front axle tubes. The collars 120 and 122 are welded and sealed around the rear axle tubes where the tubes 118 pass through openings in the collars. The inner ends of rear drive axles 17B extend into the respective chain case chamber 88 but stop short of the inner case walls 83 of the chain cases 82. Sprockets 150 are splined onto the inner ends of axles 17B and held in place with washers and capscrews. The axles 17A and 17B are mounted on suitable bearings, the outer ones of which have seals to contain oil in the chain cases.

In addition to making sub assemblies of the chain cases and the upright side walls 78 before welding the bottom wall 76 in place, each chain case and side wall 78 subassembly can be further processed as a more complete subassembly by welding in the front and rear axle tubes 106 and 118, and the support collars before joining the two outer or side transmission sections, including the formed chain cases, together with the bottom wall 76 and front and rear walls.

Figure 8:
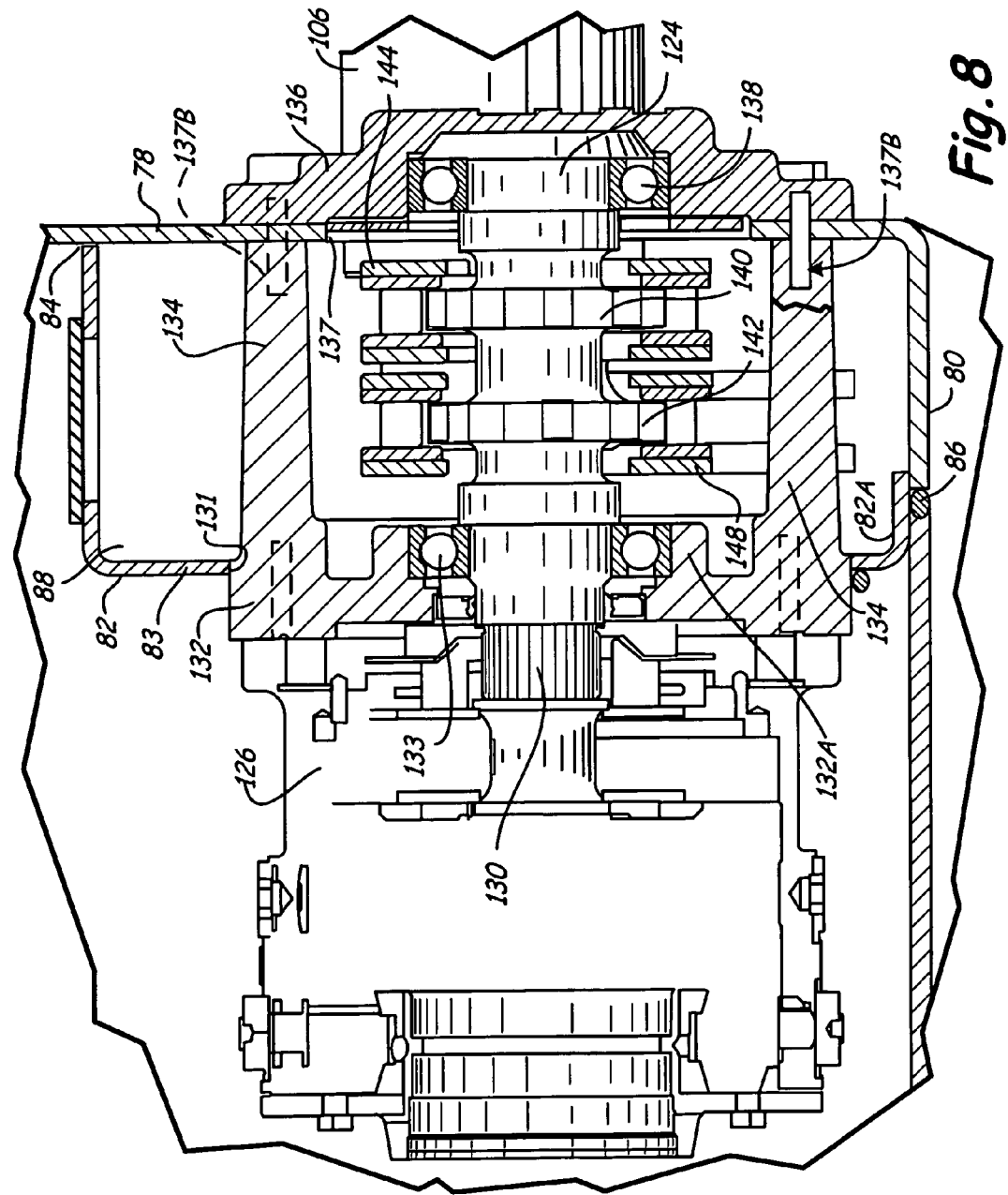
FIG. 8 is an enlarged sectional view through one chain case showing a drive shaft mounting arrangement and taken on line 8-8 in FIG. 4.

The chain and sprocket drives 92 and 94 shown as the power drives in this embodiment, are the same on opposite sides of the transmission housing. As shown in FIGS. 4, 7 and 8, cross drive shafts 124 are supported on the upright case chain walls 83, and exterior side walls 78 of the transmission housing, and are driven from suitable gear boxes, in the case of using electric motor drives, or by hydraulic motors when using conventional hydraulic drives. The drive gear boxes are shown at 126. The gear boxes 126 are right angle, bevel gear boxes that also drive through an internal planetary gear system to achieve the proper gear reduction for cross drive shafts 124 when driven by electric drive motors 128.

As perhaps best shown in FIG. 8 for the right side drive, the drive shaft 124 is not cantilevered, but is supported on bearings at both ends. The gear box 126 has an output drive shaft to connect to an end 130 of the shaft 124 with a suitable drive coupling, such as a spline. An inner drive shaft and bearing carrier 132, which also functions as a gear box support or drive support, is positioned in alignment with a suitable opening 131 in the interior case wall 83 of the formed chain case section 82, and has an end plate portion 132A that is welded in place on wall 83 to completely seal the opening 131 in wall 83 and precisely position the bearing carrier 132. The bearing carrier 132 end plate portion 132A carries a first bearing 133 supporting one end portion of the cross drive shaft 124.

As shown in FIGS. 7 and 8, the bearing carrier 132 has integral projecting spacer flanges 134 at the top and bottom that are perpendicular to the end plate portion 132A. The flanges 134 extend across the respective chain case chamber 88 and have machined end surfaces that are abutted against the interior surface of the exterior side walls 78 when the inner bearing carriers 132 are welded in place. The flanges 134 are spaced apart and are selected in width, to leave openings of size to permit the drive links or chains that are driven by the drive shafts 124 to pass to the front and rear of the chain cases, to form the drives 92 and 94.

Each of the side walls 78 has an opening 137 that aligns with opening 131, and a second or outer drive shaft and bearing carrier 136 supporting a bearing 138 for the outer end portion of the respective drive shaft 124 is piloted in each opening 137. The inner bearing carrier 132 is welded in place on the surface of case wall 83 of the chain case, as explained, but the outer bearing carrier 136 is bolted in place on the exterior of the transmission housing. The inner bearing carrier spaced flanges 134 each have one or more dowel pin holes formed in the end surface of the flanges, which align with holes in the side walls 78. The outer bearing carriers 136 each have dowel pins 137B that closely fit into the dowel pin holes in the flanges 134 for alignment of the inner and outer drive shaft and carriers. Some of the cap screws used to hold the drive shaft carriers 136 in place can thread into threaded openings in the ends of spaced flanges 134, the other cap screws are securely fastened with nuts on the inside of the side walls 78. The openings that are shown at 137 in FIG. 8 in the side walls 78 are of size so that each drive shaft 124, with integral drive sprockets 140 and 142 thereon, can be inserted through the respective side wall opening 137 for installation.

Sprockets 140 formed on drive shafts 124 on each side of the transmission housing 70 drive chains 144 forming part of the chain drives 92 to the front drive axles 17A. The chains 144 drive the driven sprockets 146 that are drivably mounted to the drive axles 17A, in order to drive wheel hubs 19A at the forward end of the transmission housing. Sprockets 142 formed on drive shafts 124 on the opposite sides of the transmission housing 70 drive chains 148 forming part of the chain drives 94. The chains 148 drive driven sprockets 150 on the rear drive axles 17B that in turn drive wheel hubs 19B. The drive between the cross drive shafts and the respective front and rear axles can be belts and pulleys or other drive links between rotating drive members on the cross shafts 124 and driven members on the axles. For example, a series of gears can link the drive and driven members.

Figure 9:
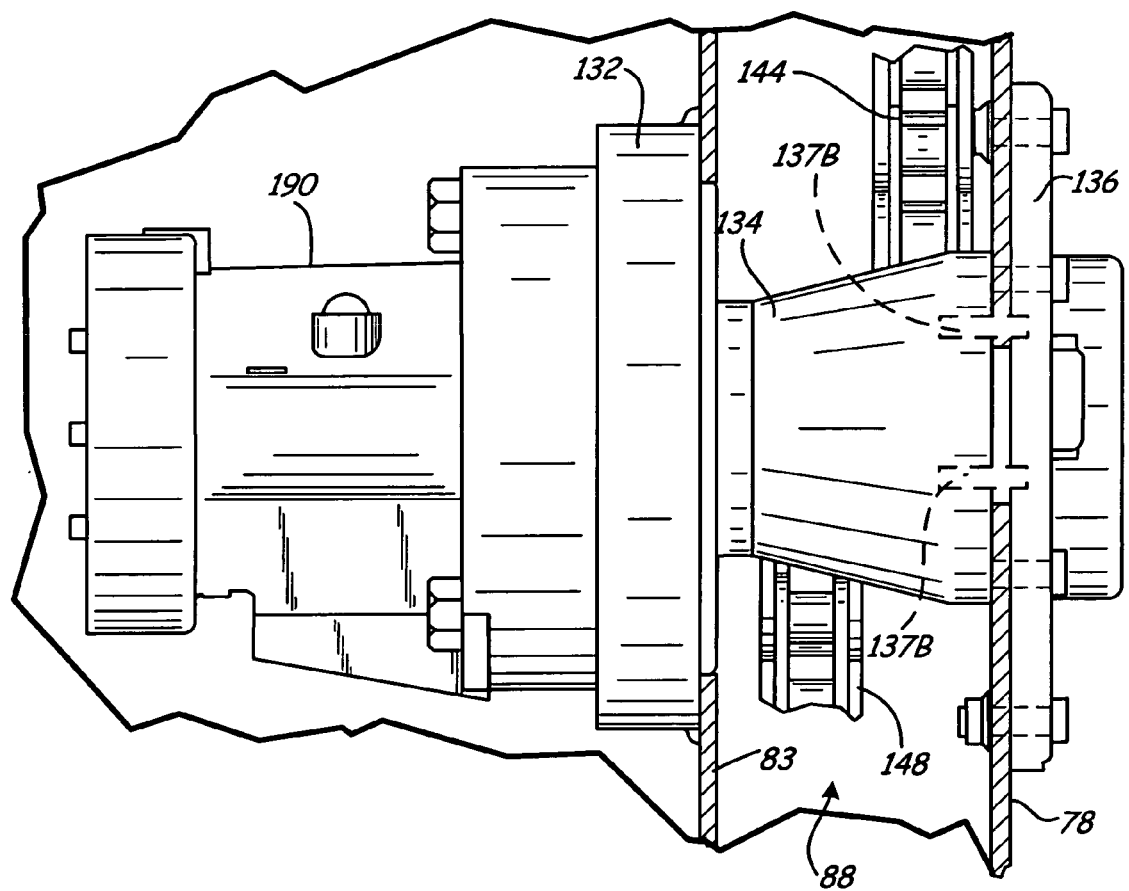
FIG. 9 is a fragmentary top plan view of the center drive support with a hydraulic drive motor installed.

FIG. 9 is a top plan view of the inner bearing carrier 132 showing a plan view of spacer flanges 134, and showing an optional drive hydraulic motor 190, mounted on the bearing carrier 132. The surface for mounting motors on the end of bearing carriers 132 is provided with two sets of mounting holes and pilot or guide shoulders so the same inner bearing carrier 132 can be used for either electric and hydraulic motors. The hydraulic motor 190 is powered by hydraulic fluid under pressure from a main loader pump 18 and is controlled by valves in a conventional manner.

Figure 6:
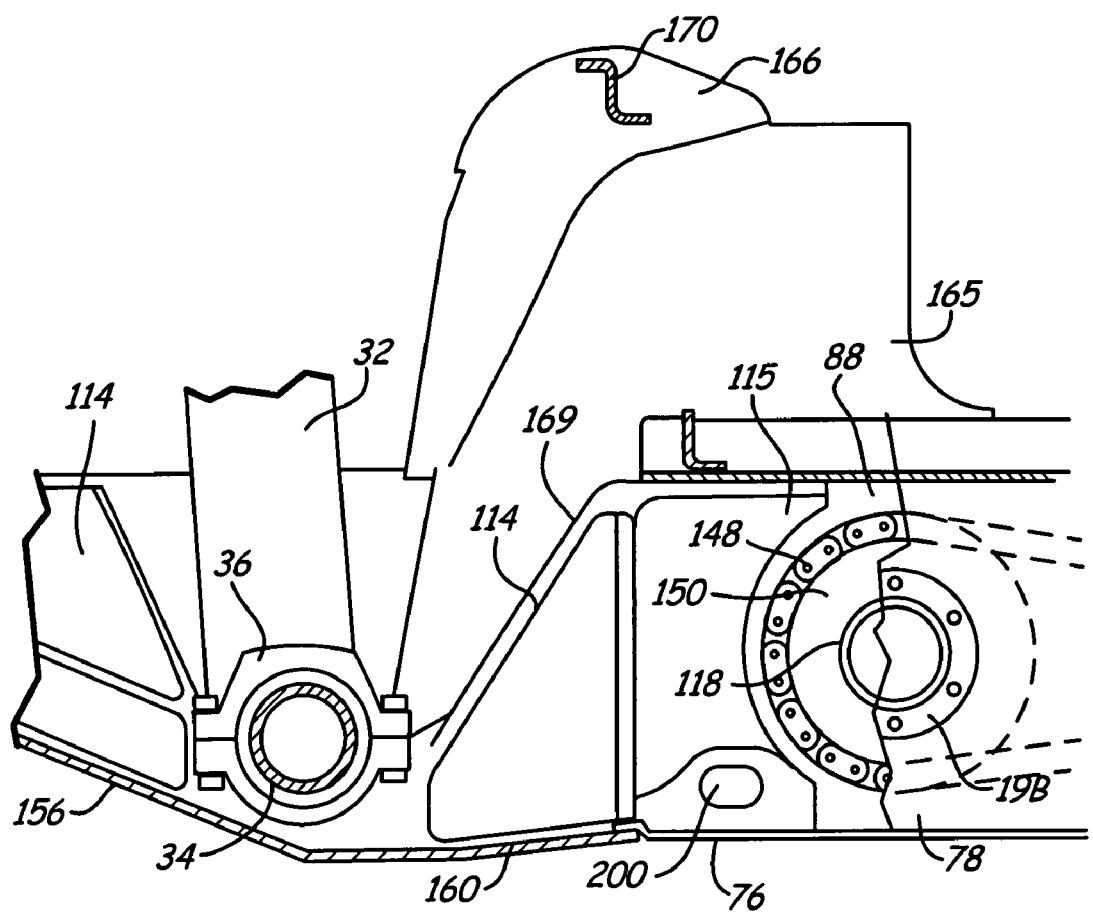
FIG. 6 is an enlarged fragmentary sectional view of a rear portion of a chain case shown in FIG. 5.

A pair of heavy duty, support arm castings 114 on the opposite sides of the machine are provided at the rear of the transmission housing 70. The castings 114 have end hubs 115 that fit inside the chambers 88 of the respective chain cases 14. The hub ends 115 protrude inwardly into the respective chain case a distance sufficient to support the castings 114. These castings 114 are then welded in place around the perimeter of the chain case, as generally shown in FIG. 6. The hubs close and seal the rear ends of the chain case. The arm castings 114 extend rearwardly from the chain cases, as shown. The hub ends 115 of casting 114 inside the chain cases can also be plug welded to the walls of the chain case to be held securely.

A rear bottom protective pan 156 is provided at the rear of the transmission housing 70 and is supported on, and is welded to the castings 114. Protective pan 156 has a curved upright wall 158 and a bottom pan wall 160. The upright wall 158 is curved at the rear corners and there are reinforcing housings 162 welded to the wall 158 at the opposite corners. The forward end of the protective pan 156 is welded to structural reinforcing housings 164 on opposite sides of the transmission housing (FIG. 2). Reinforcing housings 164 are welded to upwardly extending inner side plates or walls 165 that in turn are welded to the support arm castings 114 and to side walls 78 to make a rigid assembly. The bottom pan wall 160 of the protective pan 156 is welded to the bottom edges of castings 114 as well. Typical weld lines are indicated at 169.

Suitable cross wall members 170 and 172 extend between and are welded to the housings 164, and also are welded to the chain cases. These cross members provide support for components, such as an internal combustion engine and radiators, oil coolers and the like.

As was stated, the interior chambers 88 of the chain or power drive cases 14 are oil filled, and thus the welded construction and the formed corners of the flanges formed integral with the side walls 78 and 83 ensures that these chambers are sealed except for the covered access openings and cross drive shaft supports which are sealed as well. The all welded construction also provides great rigidity to the transmission housing 70.

Additionally, the outer bearing carrier 136, having a bearing 138 for one end of cross drive shaft 124, and the interior plate 132A of the inner bearing carrier 132 having a bearing 133 for supporting the inner end of the cross drive shaft 124 insures the cross drive shaft will withstand the loads created by driving the chain drives 92 and 94 on opposite sides of the loader. The drive shaft 124 is not cantilevered.

The rectangular cross section chain cases 14 provide support for mounting the heavy rear support arm castings 114, which provide structural support for the lift arms as well as support for the rear protective pan 156.

The transmission housing 70 can be welded in a reliable manufacturing process. Since the axle housings or tubes are fixed in position, by welding the tubes in place, and the inner bearing carrier 132 and outer bearing carrier 136 securely and accurately hold the center drive sprockets 140 and 142 of the chain drives 92 and 94, there is no need for providing drive chain adjustments on the machine.

The chain cases 14 are positioned at the outer sides of the transmission housing 70, rather than in the center, leaving space for other components such as batteries 180 and electronics for the electric drive motors 128, or valves for hydraulic motors or other components.

Figure 10:
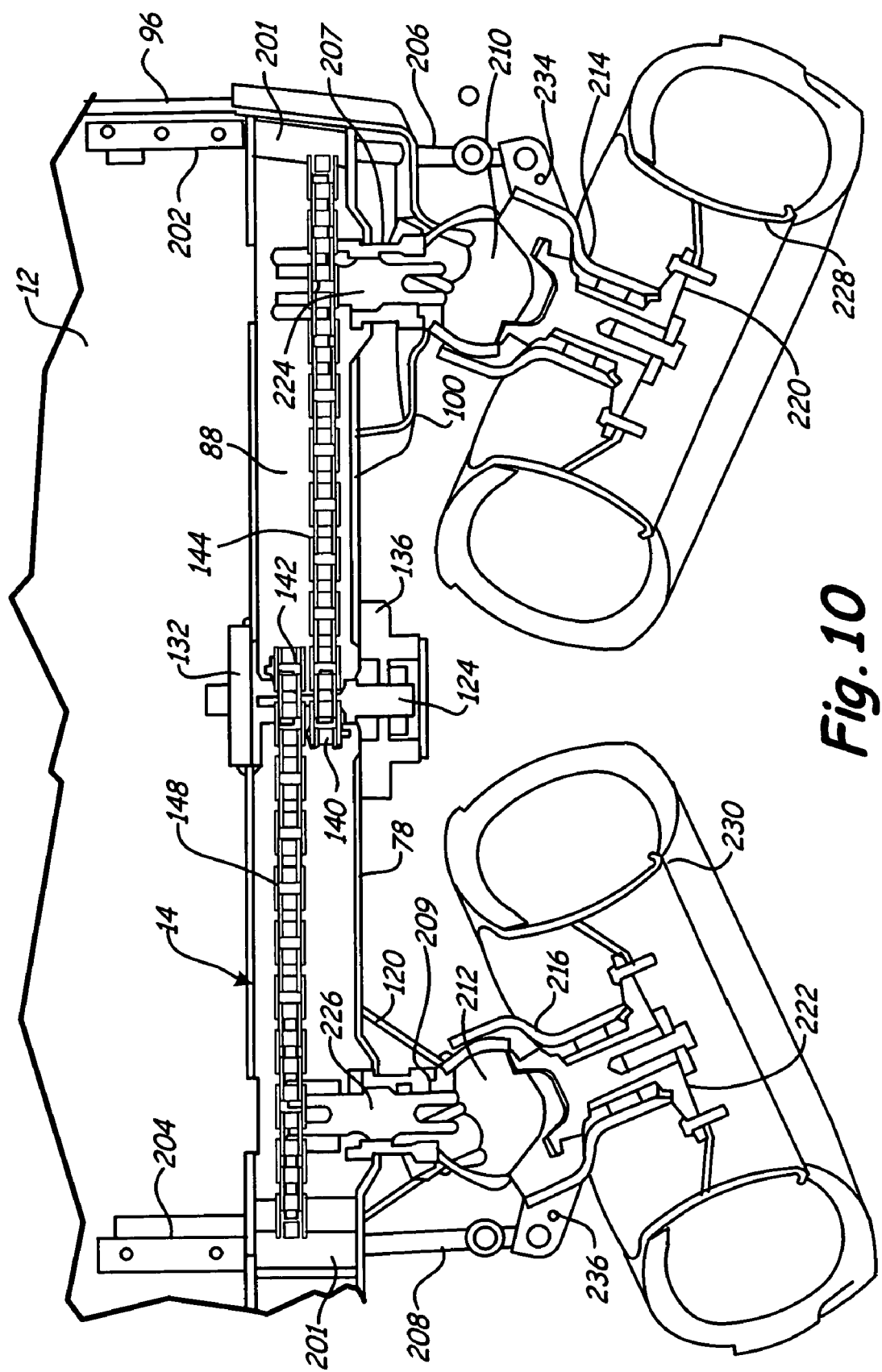
FIG. 10 is a fragmentary top sectional view of an all welded transmission housing modified for mounting four steerable wheels.

The all welded transmission housing 70, in basic form, without the axle tubes 106 and 118 that are provided for a skid steer vehicle can be utilized for an all wheel steer compact loader as well. Shown in FIG. 10 is a representation of the basic transmission housing 70, which includes the side walls 78, front panel 96, and the chain cases 14 that are constructed as previously disclosed.

Figure 3:
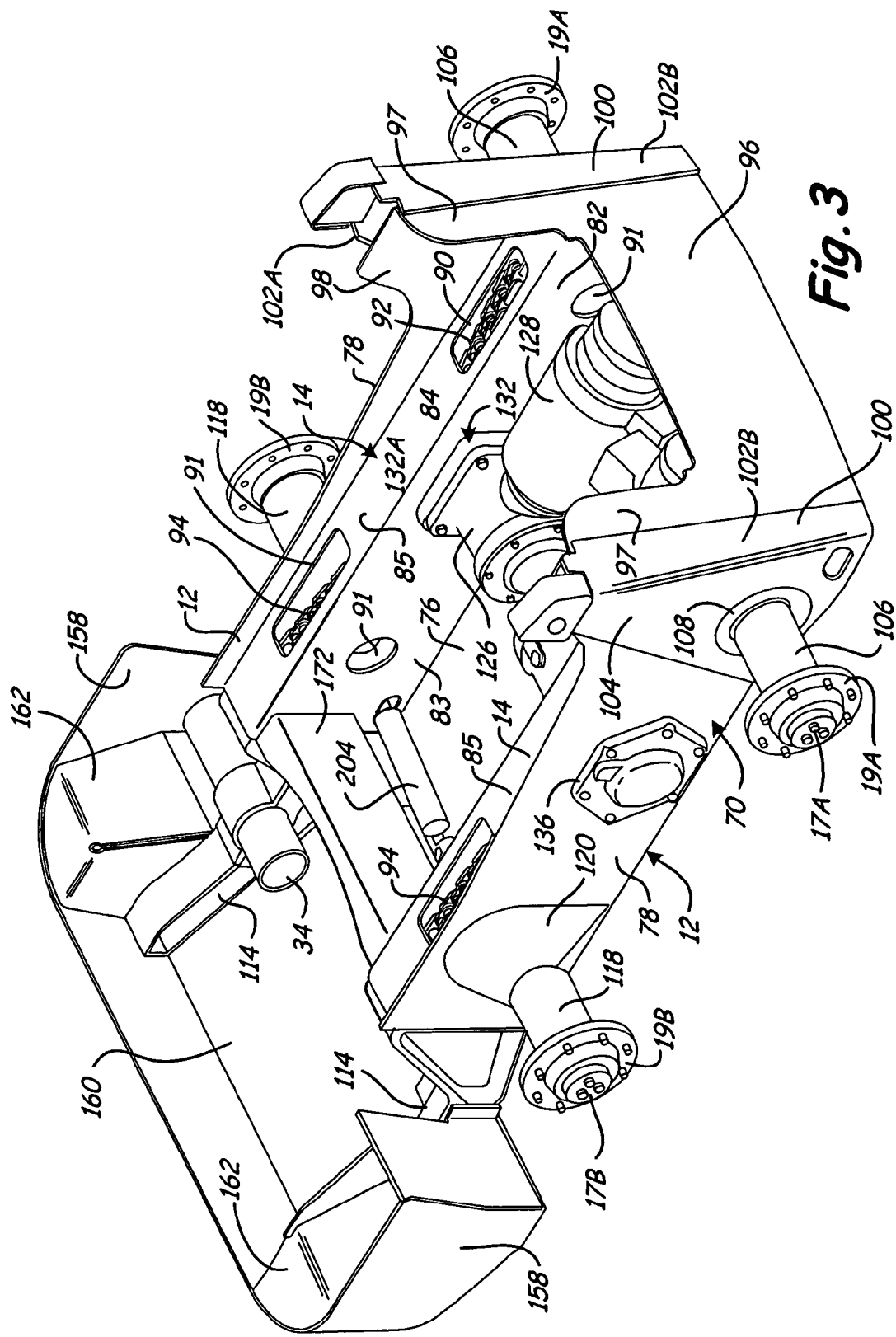
FIG. 3 is a front perspective view of the transmission housing with some parts removed for clarity.

As shown in FIGS. 2 and 5, for example, the chain cases 14 are provided with laterally extending openings 200 formed by tubular members 201 that are sealed relative to the interior chambers 88 of the chain cases. The openings or passageways 200 through tubular members 201 permit the rods of steering cylinders 202 and 204, for the front and rear wheels respectively to pass through opposite sides of the transmission housing. The cylinders 202 and 204 include extendable or retractable rods 206 and 208. The cylinders are anchored relative to the transmission housing in a suitable manner, so that the loads from extending and retracting the rods while steering are reacted back to the transmission housing. FIG. 3 illustrates the position of one steering cylinder 204, although steering cylinders are not used on skid steer loaders.

In this form of the compact loader, construction of the cross drive shaft 124 is the same as is shown in the previous figures, and the drive sprockets 140 and 142 on the drive shaft 124 are driven in the same manner through suitable hydraulic or electric motors. However, in this instance, axle tubes are not mounted on the transmission housing weldment, but instead the supports 104 and 120 that are shown for the axle tubes 106 and 118 in the first form of the disclosure support axle tubes 207 and 209, which are welded in place using the supports 100 and 120, and these axle tubes 207 and 209 support steering knuckles 210 and 212, on which the wheel supports 214 and 216 are attached. These are conventional steering knuckles that have drives to drive wheel hubs 220 and 222 from the drive shafts 224 and 226 that are driven by the sprockets 146 and 150 as previously shown, and also which permit steering the front and rear wheels. The chain drives 92 and 94 to the front and rear of the vehicle in the chain cases 14 are the same as previously shown.

The steering knuckles 210 and 212 are conventional as well, and comprise universal joints which drive the wheel hubs 220 and 222 and the wheels 228 and 230 in a conventional manner.

In order to obtain the steering function, the rods 206 and 208 of the steering cylinders 202 and 204 are connected to arms 234 and 236 that in turn swivel or steer the hubs 214 and 216, and wheels 228 and 230, respectively, in a normal manner.

It can be seen that the basic welded transmission housing can be adapted by mounting steerable axle housings 212 and 214 for an all wheel steer compact tool carrier or loader.

By extending and retracting the cylinders 202 and 204 using steering valves in a conventional manner for four wheel steer loaders, the wheels 228 and 230 are steered.

The transmission housing is provided with the tubes forming passageways through the sealed chain cases for steering cylinders or actuator 202 or 204. It can be seen that the rods for the steering cylinders 204 pass through tubes in openings in the support arm castings 114, which also are sealed around the openings by suitable welding to isolate the tubes and openings from the interior chambers 88 of the chain cases.

Although the present invention has been described with reference to preferred embodiments, workers skilled in the art will recognize that changes may be made in form and detail without departing from the spirit and scope of the invention.

What is claimed is:

1. A transmission housing for a tool carrier the transmission housing having an integral construction comprising:
    a bottom wall;
    first and second side walls secured to said bottom wall;
    first and second power drive cases, the first power drive case defined in combination with the first side wall and the second power drive case being defined in combination with the second side wall, said power drive cases each comprising a housing having a case wall forming an enclosed chamber with the respective side wall and the bottom wall and bring sealingly joined to the respective side wall and bottom wall,
    wherein the sealingly joining of the respective side walls and bottom wall to the case walls being selected from the group consisting of formed corners from a single panel, and welding to enclose a chamber for each of the power drive cases; and
    rear members closing the chamber of each of the power drive cases at rear ends thereof comprising a support arm mounted to each power drive case, each support arm having a portion fitting into a respective chamber of the respective power drive case, and being welded around a periphery of the respective power drive case to secure the support arm to the respective power drive case and to seal the rear end of the chamber of each of the power drive cases.

2. The transmission housing of claim 1 and a front member comprising a front wall that extends between the side walls of the transmission housing and the front wall being welded to the side wall, bottom wall and case walls.

3. The transmission housing of claim 1, wherein a plurality of axle housings are supported on each of the side walls of the transmission housing and extend laterally outwardly therefrom, the axle housings passing through the side walls into the chambers of the respective power drive cases on opposite sides of the transmission housing, and terminating within the respective power drive case chambers, the axle housings being welded to the side walls.

4. The transmission housing of claim 3, wherein there are four axle housings supported on the transmission housing, the axle housings comprising axle tubes laterally aligned in two pairs for mounting four axles.

5. The transmission housing of claim 4, wherein each of the axle tubes is supported relative to the respective side wall with supports welded to an exterior of the transmission housing side walls and welded to the respective axle tube at a location spaced outwardly from the respective side wall of the transmission housing.

6. The transmission housing of claim 4, and tubular members adjacent at least a pair of axle tubes, one on each side of the transmission housing, the tubular members extending across a respective power drive case chamber, and outer surfaces of the tubular members being sealed with respect to the power drive case walls and side walls to provide a passage from an interior of the transmission housing across the respective power drive case of the transmission housing to exterior sides of the transmission housing.

7. The transmission housing of claim 3, wherein a separate cross drive shaft extends across the chamber of each power drive case, and an inner bearing carrier welded to interior sides of each of the respective power drive cases on an interior of the transmission housing, each inner bearing carrier having a first bearing mounting a first portion of the respective cross drive shaft, and an outer bearing carrier mounted on an exterior of each of the side walls, each outer bearing carrier having a second bearing supporting a second portion of the respective cross drive shaft, each cross drive shaft having at least one drive member thereon between the first and second bearings for driving an axle supported on an axle housing on the transmission housing.

8. The transmission housing of claim 7, wherein said cross drive shafts each have a pair of drive members, and drive links drivably engaging the drive members on each cross drive shaft and extending in opposite directions from the respective cross drive shaft toward a front and a rear of the transmission housing, respectively, the drive links being drivably engaged with driven members on respective front and rear axles mounted in the axle housings.

9. The transmission housing of claim 7, wherein said inner bearing carriers each have portions that engage a respective inner power drive case wall and spaced flanges extending across the respective power drive case, and the flanges having ends that abut against an inner surface of an adjacent side wall, said flanges being spaced apart and on opposite sides of the respective cross drive shaft.

10. The transmission housing of claim 9, wherein said outer bearing carriers on the exterior of said side walls, and the flanges of the inner bearing carriers have mating dowels extending into both the flanges and the respective outer bearing carrier for aligning the second bearing carried by the respective outer and bearing carrier with the first bearing carried by the associated inner bearing carrier.

11. A transmission housing for a tool carrier, said transmission housing having at least one power drive case adjacent a side of the transmission housing, a drive assembly in the at least one power drive case including a cross drive shaft extending across the power drive case, said cross drive shaft having an inner drive shaft carrier on an interior wall of the power drive case, and having an outer drive shaft carrier mounted on an exterior of a first side wall of the transmission housing forming a wall of the power drive case, said cross drive shaft extending through an opening of the first side wall, a first bearing carried by the inner drive shaft carrier supporting a first portion of the cross drive shaft, a second bearing carried by the outer drive shaft carrier supporting a second portion of the cross drive shaft, and at least one drive member on the cross drive shaft positioned in the power drive case for driving drive components for powering ground drives for a tool carrier with which the transmission housing is used.

12. The transmission housing of claim 11, and a shaft drive coupled to an end of the cross drive shaft supported by the inner drive shaft carrier.

13. The transmission housing of claim 11, wherein said power drive case interior wall is substantially parallel to the first side wall of the transmission housing, the interior wall having an opening therein, and the inner drive shaft carrier having a pair of flanges that pass through the opening on the interior wall and which abut against an inner surface of the first side wall of the transmission housing, the outer drive shaft carrier being removably supported on an exterior of the first side wall of the transmission housing, said outer drive shaft carrier covering an opening in the first side wall of size to permit the cross drive shaft and drive member thereon to pass through the opening in the first side wall.

14. The transmission housing of claim 11, wherein the transmission housing has a pair of power drive cases, one on each side of the transmission housing, and wherein each of the power drive cases has a cross shaft supported on inner and outer drive shaft carriers.

15. The transmission housing of claim 14, wherein said transmission housing is an all welded and formed integral construction, and includes a bottom wall and two side walls to form parts of exterior sides of the power drive cases, and wherein the power drive cases have a generally rectangular cross section and include top and bottom walls, the power drive case walls having edge portions that mate with other walls of the transmission housing, and wherein the power drive case walls are welded to the other walls to enclose and seal junctions between all walls forming the power drive cases.

16. A transmission housing for a tool carrier, the transmission housing having first and second spaced side walls; first and second power drive cases, the first power drive case being adjacent the first side wall and the second power drive case being adjacent the second side wall, the power drive cases each being between the first and second spaced side walls, the power drive cases forming interior chambers and having rear end openings, and a support arm mounted in rear portions of each of the first and second power drive cases, each support arm having a portion fitting into a respective interior chamber of the respective power drive case and being welded to the respective power drive case to secure the support arms and to seal the rear end openings of the interior chambers of the power drive cases, the support arms having support portions extending rearwardly of the power drive cases for supporting members mounted on the transmission housing.

17. The transmission housing of claim 16, wherein the support arms extend rearwardly of the support portions formed thereon, and a rear pan secured to the support arms, the rear pan extending under the support arms and being secured to the transmission housing.

18. The transmission housing of claim 17 further comprising a cross support tube pivotally mounted on the support portions of the support arms, a pair of upright arms secured to a cross support tube to form portions of a tool carrier.

19. The transmission housing of claim 18 further comprising lift arms pivotally mounted on upper ends of the upright arms.

20. A transmission housing for a tool carrier the transmission housing having an integral construction comprising:
a bottom wall;
first and second side walls secured to said bottom wall;
first and second power drive cases, the first power drive case defined in combination with the first side wall and the second power drive case being defined in combination with the second side wall, said power drive cases each comprising a housing having a case wall forming an enclosed chamber with the respective side wall and the bottom wall and bring sealingly joined to the respective side wall and bottom wall,
the sealingly joining of the respective side walls and bottom wall to the case walls being selected from the group consisting of formed corners from a single panel, and welding to enclose a chamber for each of the power drive cases;
wherein a plurality of axle housings are supported on each of the side walls of the transmission housing and extend laterally outwardly therefrom, the axle housings passing through the side walls into the chambers of the respective power drive cases on opposite sides of the transmission housing, and terminating within the respective power drive case chambers, the axle housings being welded to the side walls;
wherein a separate cross drive shaft extends across the chamber of each power drive case, and an inner bearing carrier welded to interior sides of each of the respective power drive cases on an interior of the transmission housing, each inner bearing carrier having a first bearing mounting a first portion of the respective cross drive shaft, and an outer bearing carrier mounted on an exterior of each of the side walls, each outer bearing carrier having a second bearing supporting a second portion of the respective cross drive shaft, each cross drive shaft having at least one drive member thereon between the first and second bearings for driving an axle supported on an axle housing on the transmission housing;

wherein said inner bearing carriers each have portions that engage a respective inner power drive case wall and spaced flanges extending across the respective power drive case, and the flanges having ends that abut against an inner surface of an adjacent side wall, said flanges being spaced apart and on opposite sides of the respective cross drive shaft; and wherein said outer bearing carriers on the exterior of said side walls, and the flanges of the inner bearing carriers have mating dowels extending into both the flanges and the respective outer bearing carrier for aligning the second bearing carried by the respective outer and bearing carrier with the first bearing carried by the associated inner bearing carrier.

21. A transmission housing for a tool carrier the transmission housing having an integral construction comprising:

a bottom wall;

first and second side walls secured to said bottom wall;

first and second power drive cases, the first power drive case defined in combination with the first side wall and the second power drive case being defined in combination with the second side wall, said power drive cases each comprising a housing having a case wall forming an enclosed chamber with the respective side wall and the bottom wall and bring sealingly joined to the respective side wall and bottom wall, the sealingly joining of the respective side walls and bottom wall to the case walls being selected from the group consisting of formed corners from a single panel, and welding to enclose a chamber for each of the power drive cases;

wherein a plurality of axle housings are supported on each of the side walls of the transmission housing and extend laterally outwardly therefrom, the axle housings passing through the side walls into the chambers of the respective power drive cases on opposite sides of the transmission housing, and terminating within the respective power drive case chambers, the axle housings being welded to the side walls;

wherein there are four axle housings supported on the transmission housing, the axle housings comprising axle tubes laterally aligned in two pairs for mounting four axles; and tubular members adjacent at least a pair of axle tubes, one on each side of the transmission housing, the tubular members extending across a respective power drive case chamber, and outer surfaces of the tubular members being sealed with respect to the power drive case walls and side walls to provide a passage from an interior of the transmission housing across the respective power drive case of the transmission housing to exterior sides of the transmission housing.

\* \* \* \* \*